Dec. 7, 1965 S. W. SMALL ETAL 3,221,933
LIQUID DISPENSING DEVICE
Original Filed July 14, 1961 6 Sheets-Sheet 3

INVENTOR
SOLLIE W. SMALL
DAVID HERMAN

BY William R. Lieberman
ATTORNEY

Dec. 7, 1965  S. W. SMALL ETAL  3,221,933
LIQUID DISPENSING DEVICE
Original Filed July 14, 1961  6 Sheets-Sheet 4

INVENTORS
SOLLIE W. SMALL
DAVID HERMAN
BY
William R. Liberman
ATTORNEY

Dec. 7, 1965 S. W. SMALL ETAL 3,221,933
LIQUID DISPENSING DEVICE
Original Filed July 14, 1961 6 Sheets-Sheet 5
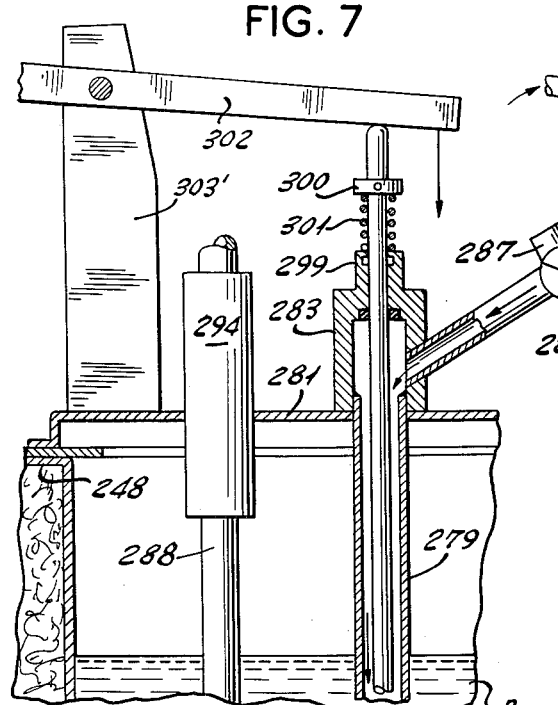
FIG. 7
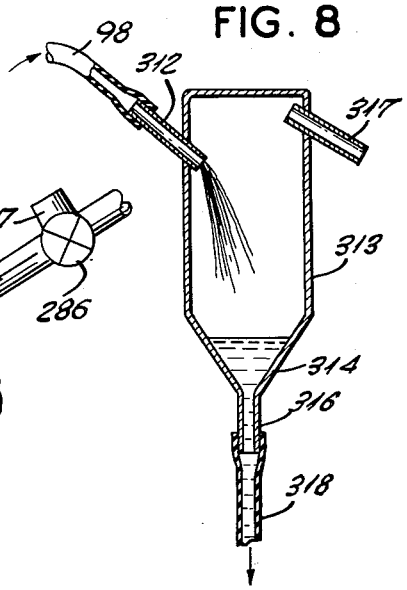
FIG. 8
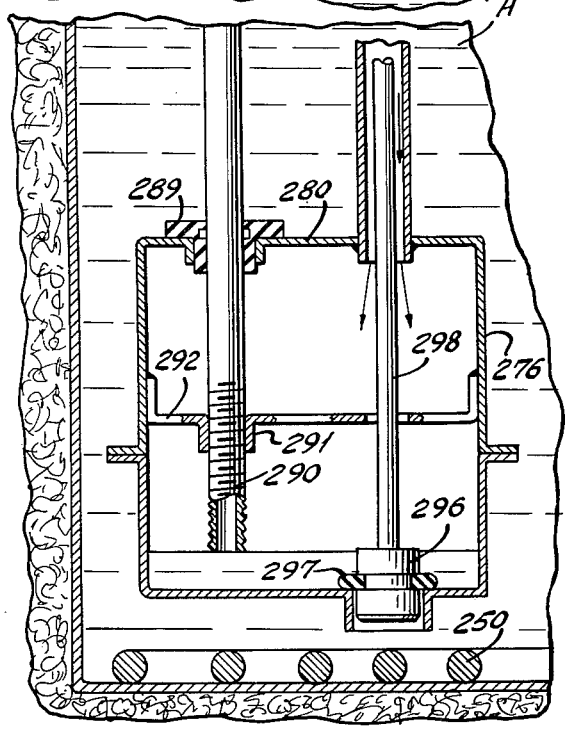
INVENTORS
SOLLIE W. SMALL
DAVID HERMAN
BY
William R. Lieberman
ATTORNEY INVENTORS
SOLLIE W. SMALL
DAVID HERMAN
BY
William R. Liberman
ATTORNEY

United States Patent Office 3,221,933
Patented Dec. 7, 1965

3,221,933
LIQUID DISPENSING DEVICE
Sollie W. Small and David Herman, Newark, N.J., assignors to Coffee-Mat Corporation, Elizabeth, N.J., a corporation of New Jersey
Original application July 14, 1961, Ser. No. 124,207. Divided and this application July 29, 1964, Ser. No. 389,238
6 Claims. (Cl. 222—21)

This application is a divisional application of our copending case, Serial No. 124,207, filed July 14, 1961.

The present invention relates generally to improvements in apparatus for the production of beverages, and it relates in particular to an improved apparatus for the brewing and dispensing of coffee beverage in unit quantities.

In the conventional hot coffee vending and dispensing machines, the coffee flavor is generally stored in the vending machine as a liquid coffee flavor concentrate or extract. Upon coin actuation of the vending machine, measured quantities of the coffee flavor and hot water are admixed as well as a sweetening material, also cream if preselected, and the resulting beverage is discharged into and dispensed in a cup. While the coffee vending machines heretofore employed and proposed operate satisfactorily from a mechanical point of view they leave much to be desired insofar as the quality of the end product is concerned. Not only is the flavor of the dispensed coffee generally inferior but it deteriorates with time and is non-uniform from cup to cup. This is in part an inevitable consequence of the use of coffee extracts and concentrates in preparing the beverage instead of freshly brewing the coffee from the coffee grounds. Another contributing fact to the inferior quality of the conventional machine vended coffee is the wide variation in the temperature of the beverage water which adversely affects the end product. While automatic coffee brewing and dispensing mechanisms have been proposed, these have been complex and costly, the prepared beverage has been expensive, and the machines possessed numerous drawbacks and disadvantages as is evidenced by the fact that they are not in commercial use to any appreciable extent.

It is, therefore, a principal object of the present invention to provide an improved apparatus for producing beverages.

Another object of the present invention is to provide an improved coffee beverage vending and dispensing apparatus.

Still another object of the present invention is to provide an improved machine for automatically brewing and dispensing a predetermined unit amount of coffee.

Another object of the present invention is to provide an improved hot water metering apparatus.

A further object of the present invention is to provide a brewing apparatus of the above nature characterized by its ruggedness, simplicity, reliability of operation, flexibility, and high quality of the end product.

The above and other objects of the present invention will become apparent from a reading of the following description taken in conjunction with the accompanying drawings, wherein:

FIGURE 7 is an enlarged fragmentary view similar to FIGURE 5 showing, however, the mechanism in a water discharge position;

FIGURE 8 is a vertical sectional view of the air beverage separator;

A principal feature of the present invention resides in the water dispensing device which comprises a water reservoir, a metering vessel immersed in said reservoir and having an inlet port formed therein communicating with said reservoir, an outlet conduit communicating with said vessel, a valve associated with said inlet port and movable between an open and closed position, means adapted to discharge the liquid from said vessel through said outlet conduit, and means alternately closing said port valve and actuating said discharge means, and deactivating said discharge means and opening said port valve. The discharge means is defined by a valved source of compressed air connected by an air conduit to the metering vessel, the outlet conduit extending into the metering vessel below the level of the air conduit. Water is delivered to the reservoir only when the level thereof falls below a predetermined point and the reservoir water exceeds a predetermined temperature.

Other features of the present invention will become apparent from the detailed description of the embodiment thereof as hereinafter set forth.

Figure 1:
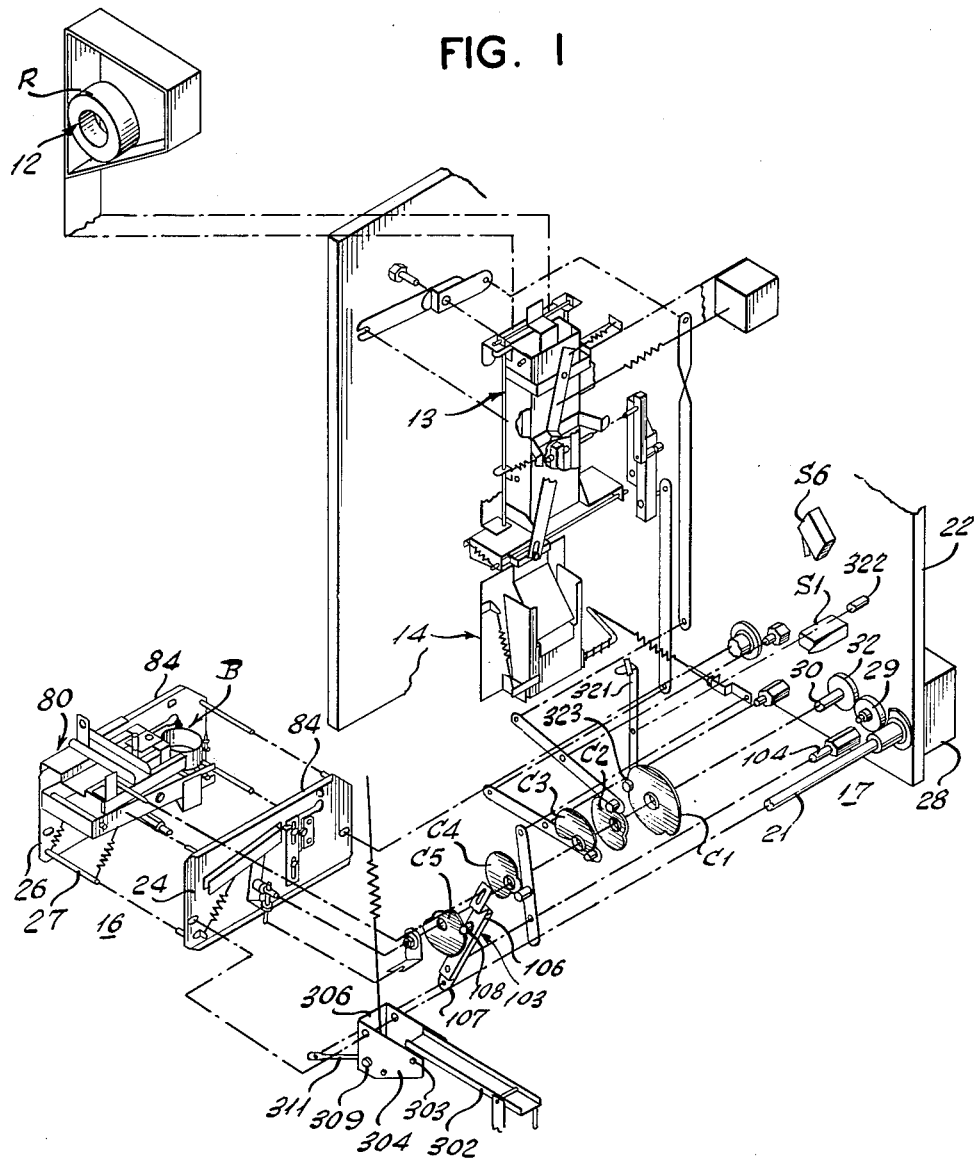
FIGURE 1 is a fragmentary perspective view of one form of the filter element forming and handling mechanism and the brew and sequence control assembly constructed in accordance with and embodying the present invention, parts being shown rotationally and laterally offset for convenience of illustration.
Figure 2:
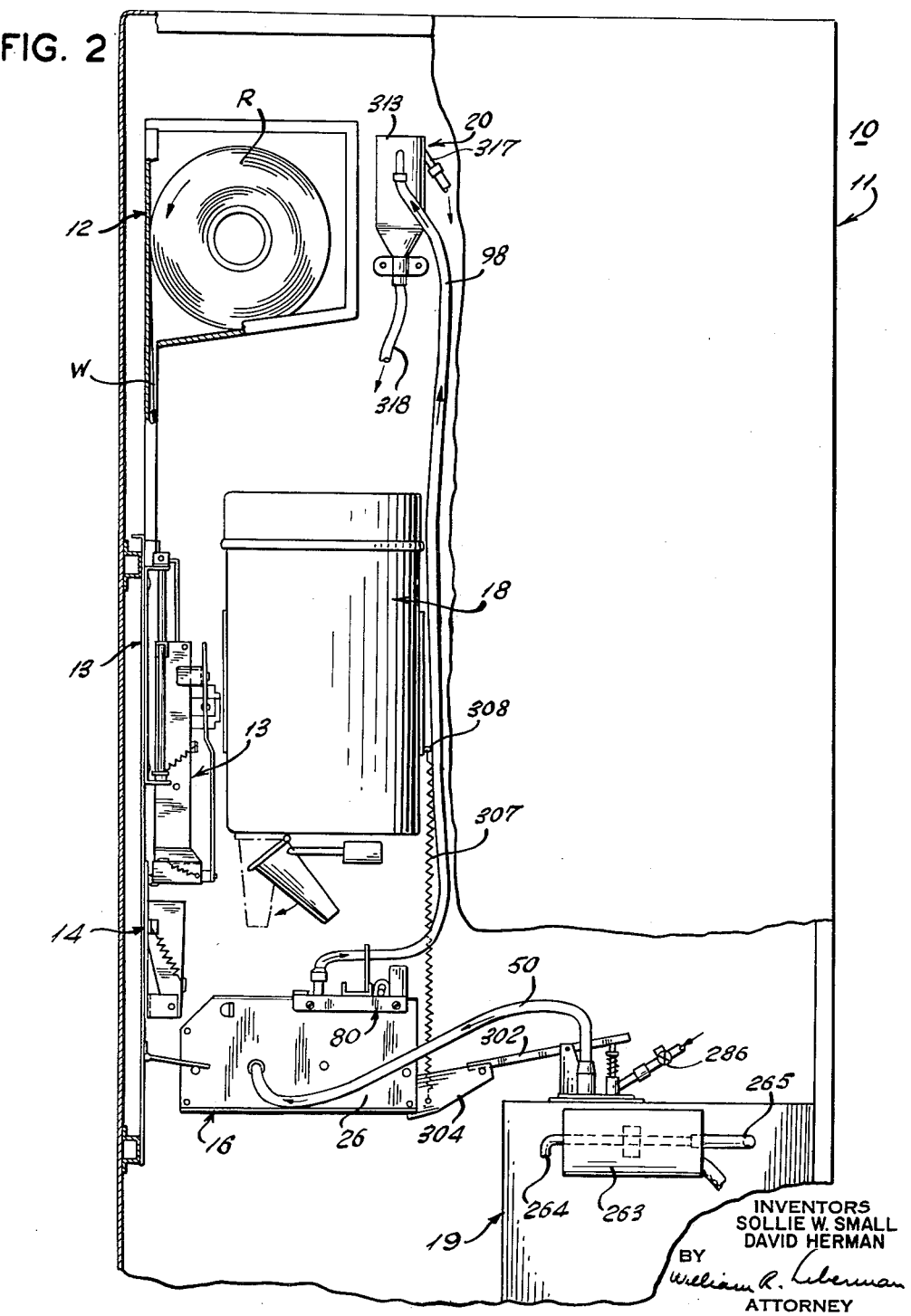
FIGURE 2 is a fragmentary front elevational view of the improved apparatus according to the present invention.
Figure 3:
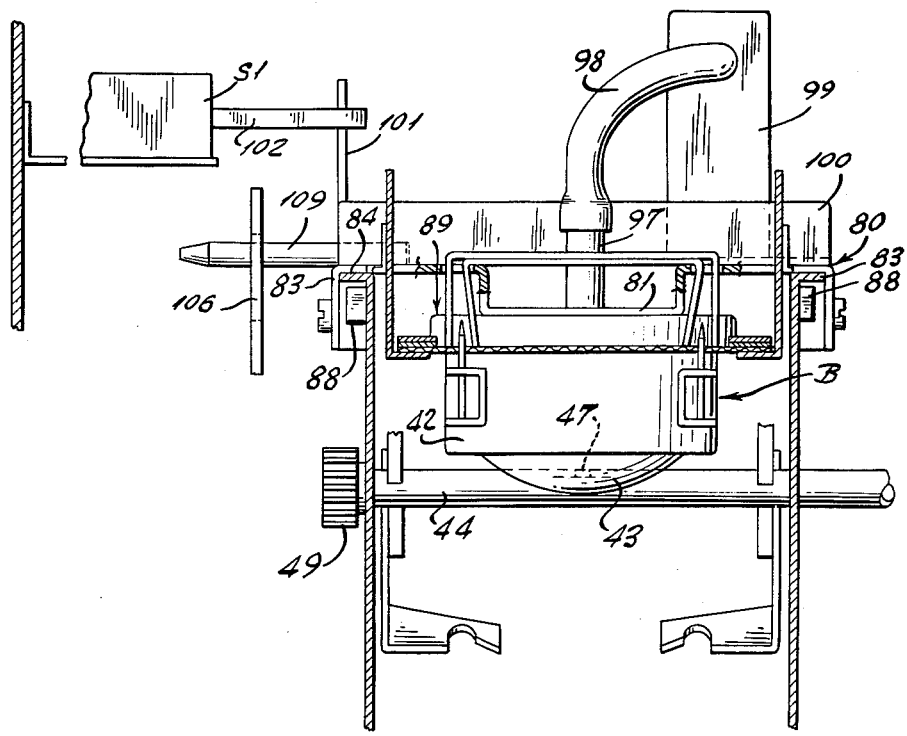
FIGURE 3 is a transverse sectional view of the brew assembly.
Figure 4:
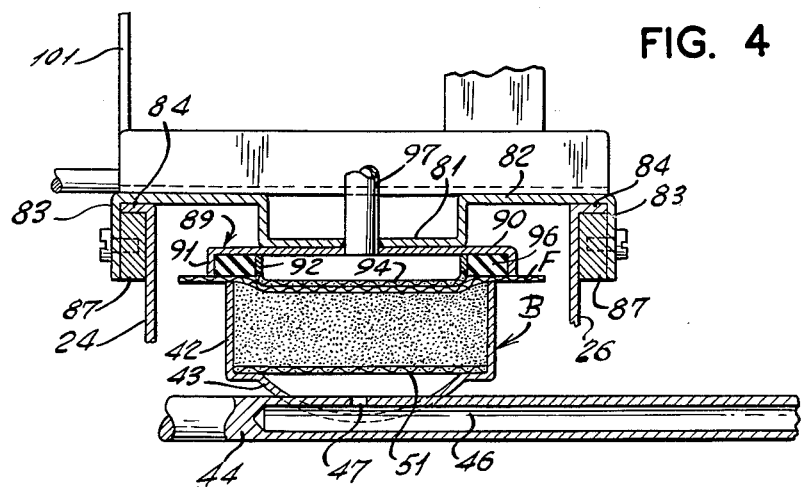
FIGURE 4 is another transverse sectional view of the brew assembly.

Referring now to the drawings which illustrate a preferred embodiment of the present invention, and particularly FIGURES 1 and 2, reference numeral 10 designates generally the improved apparatus which includes a cabinet 11 in which the various components and assemblies of the apparatus are suitably housed and mounted. The apparatus comprises a storage compartment 12 supporting a roll R of filter material web W in the upper part of the cabinet 11, a web feeding, indexing and severing device 13 disposed below the storage compartment 12, and a filter element transfer mechanism 14, in turn disposed below the web indexing and severing device 13. Adjacent to and in alignment with transfer mechanism 14 is a brew assembly 16 which includes a cycle sequence control and motivating mechanism 17. A coffee metering hopper 18 is located above brew assembly 16. A hot water tank and feed water metering device 19 is disposed adjacent brew assembly 16 and a beverage air separator 20 is located in the upper part of cabinet 11.

The brew assembly 16 and sequence control assembly 17 include a pair of laterally spaced cantilever rods 21 projecting from and mounted on a wall 22 by means of suitable brackets, which rods 21 carry a pair of parallel transversely spaced laterally extending mounting plates 24 and 26 disposed forward of the wall 22 and tied together by cross rods 27. Mounted on the rear face of wall 22 is an electric brew motor 28 having a drive shaft projecting through said wall 22 and carrying a drive gear 29. A sequence timing first cam shaft 30 is suitably journalled to wall 22 and projects forwardly thereof and carries a gear 32 mating with the motor driven gear 29.

Mounted on cam shaft 30 and spaced along the length thereof and rotatable therewith are a plurality of timing and motivating cams C1, C2, C3, C4 and C5, the shapes and relative phasing and angular positions of which will be described hereinafter. Cam C1 controls the energization of brew motor 28; cam C2 motivates the filter indexing mechanism; cam C3 motivates the filter clamping device; cam C4 motivates the filter transfer mechanism; and cam C5 effects the sliding of the brew head and the motivating of the hot water feed valve.

The brew receptacle is of open topped cup shaped configuration and is designated by the letter B and includes a cylindrical wall 42 and a downwardly convex or dished bottom wall 43 connected to the lower edge of wall 42 by a peripheral flange. The receptacle bottom wall 43 has a transversely extending slot formed therein which registers with a transversely extending shaft 44 and is affixed in liquid tight relationship thereto. Formed in shaft 44 is a longitudinally extending bore 46 which communicates with the bottom of receptacle B by way of an opening or port 47 formed in the wall of shaft 44, the bore 46 extending only to one end of shaft 44. The opposite ends of shaft 44 project through and slidably register with transversely aligned vertical slots formed in plates 24 and 26. The end of shaft 44 adjacent plate 24 is closed and has affixed to the free end thereof along the outer face of plate 24 a pinion 49. The opposite end of shaft 44 is connected to a flexible pipe 50.

A perforated plate or screen member 51 rests on and is secured by welding or the like to the peripheral border of the receptacle bottom wall 43 and has openings therein which will not permit the passage of fine coffee grounds but will permit the free passage of water.

The brew assembly includes a slide plate 80 having a medial longitudinal channel extending along the length thereof and provided with a flat bottom wall 81. Longitudinal plates 82 extend along the sides of slide 80 and terminate in depending lips 83, the outer borders of plates 82 slideably resting on flanges 84 directed outwardly from the upper edges of plate 24 and 26. In order to restrict the plate 80 to a sliding movement along flanges 84, a pair of lock bars 87 are screw-secured to the inner faces of lips 83 and slideably engage the under faces of flanges 84 and the outer upper borders of plates 24 and 26. A pair of oppositely disposed lugs 88 are located on plates 24 and 26 in the path of bars 87 to limit the forward movement of slide plate 80.

Secured to the underface of slide channel wall 81 is a brew head-defining cap member 89, including a top disc shaped wall 90 underlying channel wall 81 and of somewhat larger diameter than brew receptacle wall 42 and terminating in a depending peripheral skirt 91. A concentric collar of somewhat smaller diameter than that of receptacle wall 42 depends from the cap wall 90 to a level slightly above that of the lower edge of skirt 91, and has secured to its lower edge a filter element reinforcing perforate plate or screen member 94. Nesting in the space delineated by skirt 91 and collar 92 is a resilient annular gasket or washer 96 formed of rubber or other suitable material. An upright outlet pipe 97 communicates with the interior of head 89 by way of a central opening formed therein, and is connected to the beverage outlet by way of a coupled flexible tube 98. Tube 98 extends through an opening in a transversely offset upright bracket plate 99 carried by a channel member 100 extending across and affixed to top of slide 80. Also projecting upwardly from slide 80, at its trailing end, is an arm 101. A normally open switch S1 is suitably supported and provided with a switch closing actuating arm 102 disposed in the path of arm 101 to be engaged and motivated thereby when slide 80 is in its fully advanced position.

The brew head carrying slide 80 is moved between its retracted and advanced position in properly timed relation by cam C5. A rocker lever 103 is pivoted between its ends to a pin support 104 and is provided with opposite upper and lower legs 106 and 107. A cam follower 108 is mounted on lever leg 106 between its ends and engages cam C5, the upper end of leg 106 having a longitudinal slot formed therein which engages a pin 109 mounted in and projecting transversely from slide 80. Thus, the rocking of lever 103 by cam C5 effects reciprocation of slide 80. When cam follower 108 engages the raised section of cam C5, slide 80 is in its retracted position, and when it engages the cam depressed section slide 80 is in its advanced position.

The water heating and metering arrangement 19 comprises a tank assembly 243 insulated on its four sides and bottom and uninsulated at its top and including an inner shell 244 nesting in an outer shell 246, and separated therefrom by a filler 247 of suitable heat insulating material, the upper edges of the outer shell 246 being provided with a peripheral rim 248. Resting atop the shell 244 is an uninsulated metal closure lid 249 which serves the additional purpose of condensing steam which evolves from the water A disposed in tank 243. An electric resistance heater element 250 of the clad type rests on the bottom of inner shell 244 and is provided with electrical leads extending through the tank walls. A water feed pipe 251 communicates with the interior of tank 243 by way of an opening in lid 249, and is connected to a source of water by means of a normally closed valve 252 actuated by a solenoid 253.

Mounted on lid 249 by means of a bracket 254 and disposed above the level of the lid is a normally closed switch 256 provided on its underface with an actuating arm 257, the raising of which effects the opening of switch 256. A float member 258 is located in tank 243 and is raised and lowered in accordance with the level of the water A. The float 258 carries an upright actuating rod 259 which projects through a bushing 260 in lid 249 and when in raised position bears against switch arm 257 to actuate switch 256. Switch 256 is so located that it is actuated to its open position when the level of the water A reaches a height which allows for a vapor space 261 between lid 249 and the top level of water W.

A small housing 263 is supported atop the side wall of the tank outer shell 246, and encloses a metal steam tube 264 having an open outlet disposed outside housing 263 and an inlet connected to the vapor zone 261 by way of a hose 265 and a tube 266 projecting through the wall of tank 243. A metal plate 267 is affixed, in good heat transfer relation, to metal tube 264 and carries a double throw bimetal thermostatic switch 268. In housing 263, the space between steam tube 264 and outer jacket 246 is filled with a heat insulating filler 269. The space in front of the thermostat is clear, permitting the passage of air.

The thermostatic switch 268 includes a bimetal arm 270 carrying contacts 271 at its lower end which alternately engage contact element 272 or 273, the element 273 being engaged when the bimetal arm 270 is above a predetermined temperature about or slightly less than that of boiling water and the contact 272 being engaged at a somewhat lower temperature. Contact element 272 is connected to one terminal of resistance heater 250, the other terminal of which is connected to a first pole 274 of a source of electric current, the other pole being connected to switch arm 270. Contact element 273 is also connected to the current source first pole 274 by way of series connected switch 256 and water supply valve actuating solenoid 253.

By reason of the above water heating arrangement, a supply of hot water at a substantially constant temperature is always available substantially independent of the rate of discharge. In the event that the temperature of the water A is somewhat below the boiling point thereof, the power circuit to heater 250 is completed to energize the heater since the bimetal arm has cooled sufficiently to effect its engagement with contact element 272. Concurrently, contact element 273 is disengaged thereby to prevent the delivery of water to tank 243 since the valve solenoid cannot be energized. Upon water A being heated to its boiling point, bimetal arm 270 is heated by the steam condensing in or passing through tube 264 to switch said arm 270 out of engagement with contact element 272, deenergizing heater 250, and into contact with contact element 273. In the event that the level of the water A is low, switch 256 is permitted to close by lowered float 258, and the valve solenoid energized to open valve 252 until sufficient water is introduced into the tank to raise the level thereof and consequently float 258 to a position opening switch 256 and deenergizing solenoid 253 to close valve 252. It is apparent that since cold feed water can be delivered to tank 243 only when the water therein is at about its boiling point there is a very narrow range in fluctuation of the water temperature.

The brew water metering system includes a water metering vessel 276 located in tank 243 a short distance above the bottom thereof and having a downwardly directed inlet port 277 formed in its bottom wall and provided with a depending peripheral lip 278. The metering vessel 276 is supported by a vertical tube 279 whose lower end enters vessel 276 through and in liquid tight relationship with an opening formed in the vessel top wall 280, and is affixed to wall 280. Tube 279 depends from a flat topped cap 281 overlying and closing an opening 282 formed in tank lid 249, and is affixed to the cap and registers with an opening therein. Mounted atop cap 281 and communicating with tube 279 is a hollow cylindrical coupling member 283 having a laterally upwardly extending connecting tube 264 communicating, by way of a three way valve 286, alternately to a source of compressed air or to the atmosphere. Valve 286 normally connects tube 279 to the atmosphere by way of coupling member 283 and tube 284 and is actuated by a solenoid 287, the energization of which effects the connection of tube 279 to the source of compressed air.

A vertical outlet tube 288 slidably projects into vessel 276 through top wall 280 by way of a water tight bushing 289, the lower end of the tube 288 being externally threaded as at 290 and engaging a tapped collar 291 carried by a bracket 292 secured to and extending across the vessel 276 substantially at its midpoint. The level of the bottom of outlet tube 290 is below that of inlet tube 279, and is vertically adjustable by rotating the outlet tube 290 thereby to vary the unit quantity of metered water. The upper section of outlet tube 288 passes through and slidably and rotatably registers with a bushing 294 mounted on cap 281. Outlet tube 288 is connected by way of flexible hose 50 to hollow shaft 44 of brew receptacle B.

Figure 5:
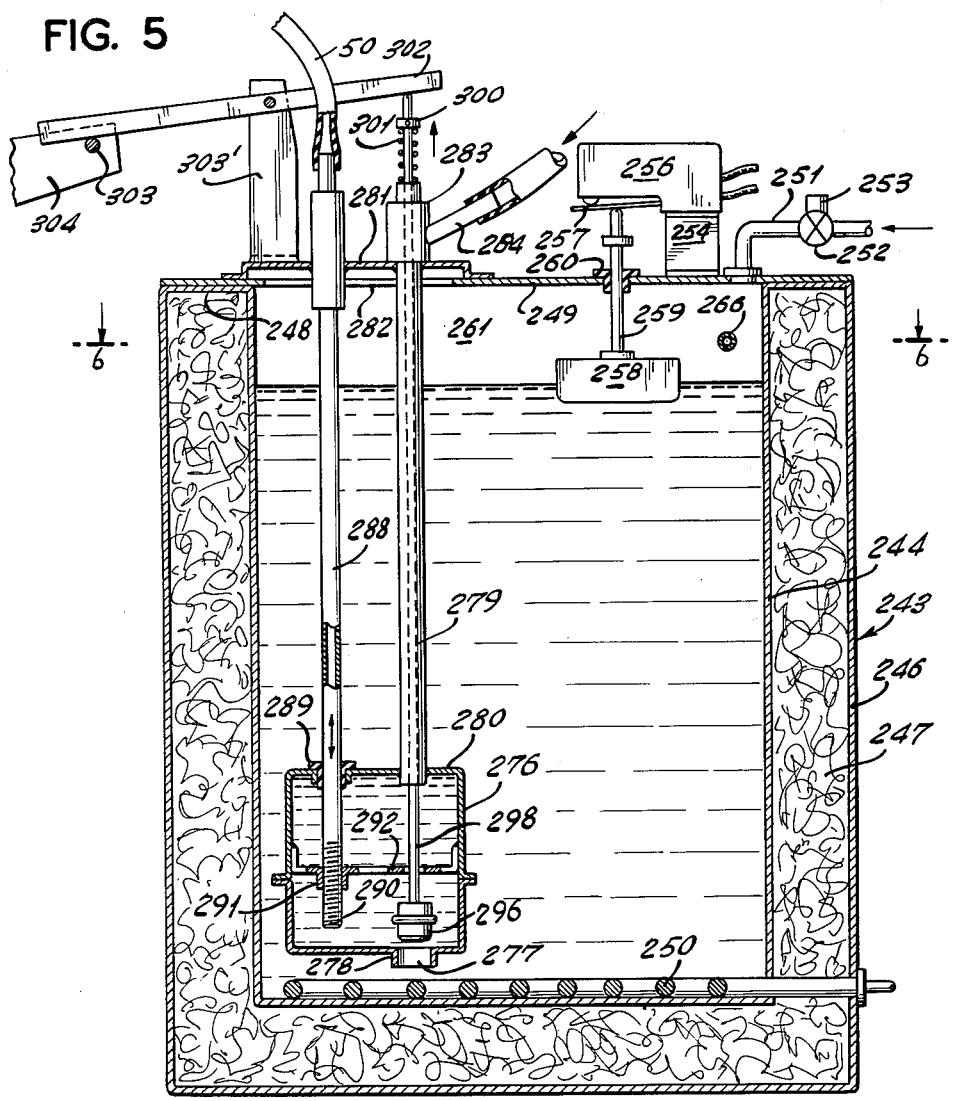
FIGURE 5 is a vertical sectional view of the hot water tank and water feed mechanism.
Figure 6:
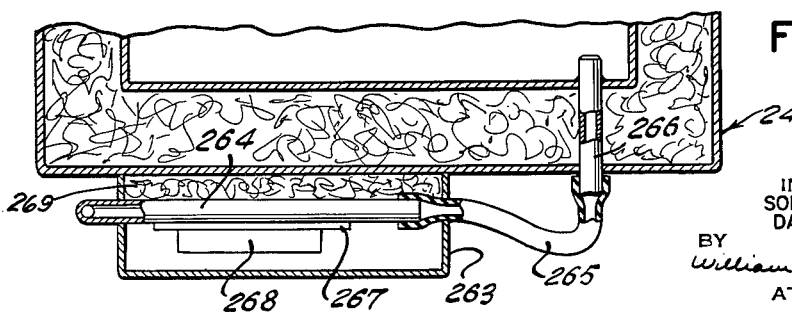
FIGURE 6 is a fragmentary sectional view taken along line 27—27 in FIGURE 5.

Associated with vessel inlet port 277 is a closure valve member 296 of cylindrical configuration provided with a rubber ring 297 which engages a peripheral groove formed in member 296. Valve member 296 is mounted on the lower end of a valve stem or rod 298, and is movable thereby between a lower port closing position, as illustrated in FIGURE 7, and a raised port open position, as illustrated in FIGURE 5. Valve rod 298 is of smaller diameter than the inner diameter of the tube 279, and extends coaxially through tube 279 and slidably projects through a sleeve 299 mounted atop coupling member 283. An annular stop member 300 is affixed to the upper part of valve rod 298, and a helical compression spring 301 is entraped between the stop member 300 and sleeve 299 normally to urge valve rod 298 to its raised position and valve member 296 to its open position.

The valve rod actuating mechanism includes a lever 302 pivoted between its ends to an upright bracket 303' mounted on cap 281. One end of lever 302 bears upon the upper end of valve rod 298, and the opposite end of lever 302 bears against an underlying rod 303. This rod 303 is supported by and between the leading upper corners of a pair of parallel bracket plates 304, the trailing edges of which are connected by a cross plate 306. The upper trailing corners of bracket plates 304 have aligned openings formed therein which rotatably register with support rod 21, and a tension spring 307 extends from an upper stationary lug 308 to a cross bar carried by plates 304 to urge them resiliently to a raised position. A cross rod 309 is carried by and between the lower trailing corners of plates 304 and is connected by a rod 311 to the bottom leg 107 of rocker lever 103. Thus, the swinging of lever 103 by cam C5 to advance the brew head slide plate 80 effects the retraction of connecting rod 311 to swing arms 304 upwardly and rock lever 303 clockwise, to depress valve rod 298 and close port 277 with valve member 296. When lever 103 retracts brew head slide plate 80, rod 298 is permitted to be raised by spring 301 thereby to open port 277.

In order to separate the compressed air from the coffee brew and release the pressure of the compressed air on the discharged coffee brew, brewer outlet hose 98 is connected through a downwardly forwardly inclined pipe 312 into the upper section of a closed top cylindrical chamber 313 having a funnel shaped base 314 terminating in a depending liquid outlet pipe 316. An air outlet pipe 317 effects communication between the top of chamber 313 and the atmosphere. Chamber 313 is located in the upper part of the apparatus, and is connected to the coffee discharge spout by a flexible hose 318 engaging funnel pipe 316.

The brew cycle control mechanism includes a single cycle timing device 320, diagrammatically shown, which is provided with a series of normally open switches S2, S3, S4 and S5 which are successively closed in timed sequences for predetermined periods in the known manner as will be hereinafter set forth. The timer switch assembly 320 is of conventional construction and may include switch control elements associated with each of the switches S2, S3, S4, S5 and actuated in adjustable timed sequence by a timing motor in the well known fashion and according to the cycle hereinafter set forth. Timer 320 is motivated for a single cycle by the usual coin actuated mechanism. Also provided is a double throw switch S6 including an arm AS6 and poles 1S6 and 2S6 respectively. A lever 321, pivoted between its ends to a post 322, carries a cam follower 323 at one end thereof which engages cam C1 and is suitably coupled at its other end to switch arm AS6. Cam C1 rotates counterclockwise, as viewed in FIGURE 9, and has two recesses 1C1 and 2C1 spaced approximately as illustrated, switch arm AS6 engaging contact 1S6 when follower 323 registers with the raised portion of cam C1 and contact 2S6 when the follower registers with depressed section 1C1 or 2C1.

Electrical conductor lines 324 and 326 are connected to opposite poles of a suitable source of current. The brew motor 28 is connected between line 326 and switch arm AS6, switch contact 1S6 being directly connected to line 324, and switch contact 2S6 being connected in series with switch S2 to line 324, and likewise in series with switch S5 to line 324. Switches S4 and S1 and the air valve solenoid 287 are series connected between lines 324 and 326. It should be noted that the closing intervals of switches S2, S3 and S5 are relatively short and that of switch S4 relatively long, corresponding to the time required for brew water under air pressure to pass through the brew receptacle and completely into the air separator. Furthermore, the closing of switch S4 coincides with the registry of follower 323 with cam section 2C1 when the brew receptacle is in its fully raised position in tight engagement with the brew head.

Figure 9:
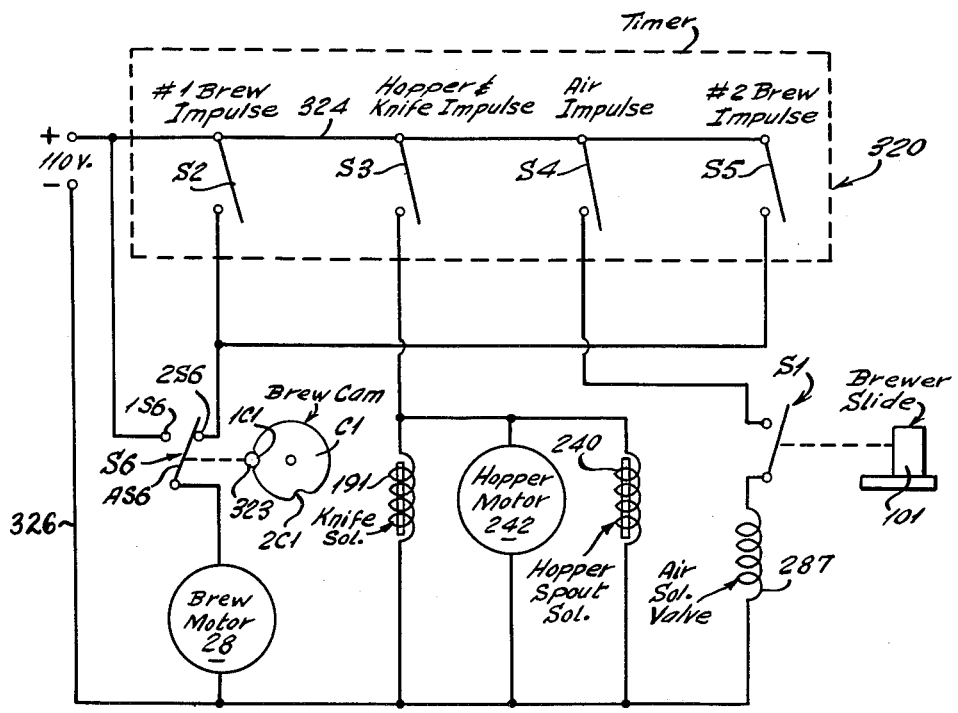
FIGURE 9 is a schematic view of the electrical circuit controlling cycle of operation of the improved apparatus.
Figure 10:
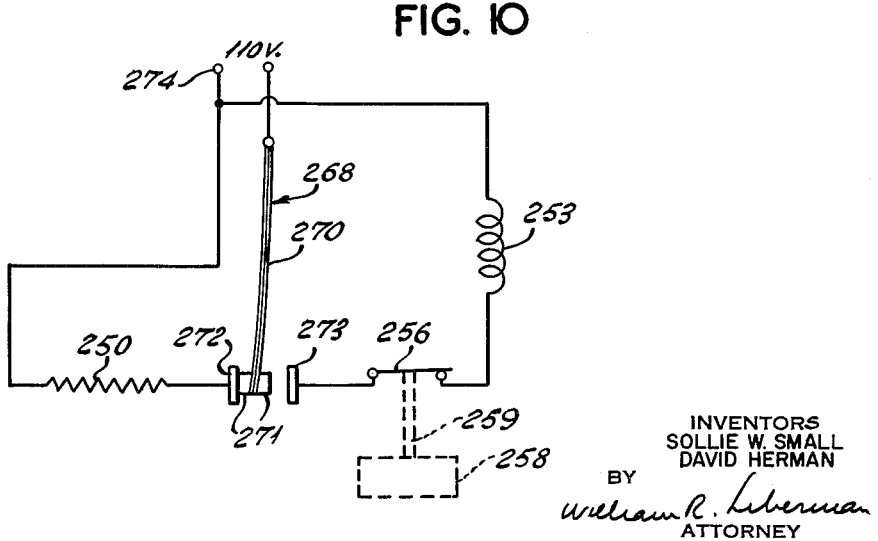
FIGURE 10 is a schematic view of the water tank filling and heating circuit.

Considering now the operation of the apparatus described above, in its rest or dormant position the circuit network is as illustrated in FIGURE 9; follower 323 registering with cam recess 1C1 to open the brew motor circuit and the brew head carrying slide 80 is in its retracted position, follower 61 registering with cam section 1C6. Upon initiation of the brew cycle by the energization of timer 320, switch S2 is first momentarily closed to energize brew motor 28 which rotates the cam shafts and the cams carried thereby including cam C1 which swings switch arm AS6 into engagement with contact 1S6 continuing the energization of brew motor 28, whereafter switch S2 is opened.

Following the charging of the lower receptacle B with ground coffee and the application and locking of a filter element F thereto by the operation of the cams in the manner described in detail in the above-identified co-pending patent application, the brew head slide 80 is then advanced by cam C5 and the associated linkage to a position in which brew head 89 is above filter element F and in alignment with brew receptacle B, the abutment member 101 is simultaneously engaging switch arm 102 to close switch S1 and permit the opening of compressed air valve 286, when switch S4 is actuated.

Prior thereto, however, and simultaneous with the advance of brew head slide 80, cam C5 and the associated linkage swing lever 302 to depress rod 298 and close port 277 with valve member 296, vessel 276 having been previously filled with water through the open port 277. Switch S4 is then closed by timer 320 which, by way of closed switch S1, energizes solenoid 287 to switch valve 286 and introduces compressed air through pipe 279, which forces hot water in vessel 276 upwardly through pipe 288, through hollow shaft 44 by way of tube 50, through the coffee grounds in brew receptacle B, through filter F and brew head 89, and thence to the air separating chamber 313. The switch S4 is closed for the time sufficient to permit the compressed air to transport substantially all the hot water in vessel 276 above the lower end of the tube 288 to air separator and pressure release chamber 313. Since the water in vessel 276 below the bottom of tube 288 is not discharged through the tube, the unit amount of water metered may be adjusted by varying the lower level of tube 288 as earlier described. Any air entering the chamber 313 is separated from the coffee brew and escapes by way of pipe 317, whereas the coffee brew flows by gravity from the bottom of chamber 313 to the coffee discharge spout.

Following the brewing of the coffee, switch S4 is opened to deenergize solenoid 287 and switch valve 286 to connect tube 279 to the atmosphere. Switch S5 is then momentarily closed to energize brew motor 28 and rotate the cams, the raised portion of cam C1 engaging follower 323 to close switch contact 1S6 and continue the energization of brew motor 28.

The apparatus described above and the operation thereof is set forth in greater detail in the above-identified co-pending patent application.

While there has been described and illustrated a preferred embodiment of the present invention, it is apparent that numerous alterations, omissions and additions may be made without departing from the spirit thereof.

What is claimed is:
1. A liquid dispensing device comprising a liquid reservoir, a metering vessel immersed in said reservoir and having an inlet port formed therein communicating with said reservoir, an outlet conduit communicating with and projecting into said vessel to a predetermined level therein, an air conduit communicating with the interior of said vessel at a point above said predetermined level, means including a normally closed first valve connecting said air conduit to a source of compressed air, a second valve associated with said inlet port and movable between an open and closed position, a first means for alternatively opening and closing said second valve, and a second means for effecting the opening of said first valve following the closing of said second valve and for closing said first valve when said second valve is open.

2. A device according to claim 1 wherein said first valve comprises a three way valve for alternatively connecting said air conduit to said compressed air source and to the atmosphere.

3. A device according to claim 1, including means for adjusting the level of said outlet conduit in said vessel.

4. A device according to claim 1, including an air separator and means connecting said air separator to said outlet conduit.

5. A device according to claim 1, including heating means for maintaining said reservoir at a predetermined temperature.

6. A device according to claim 1 including means for maintaining the water in said reservoir at a predetermined level.

References Cited by the Examiner
UNITED STATES PATENTS

| | | | |
|---|---|---|---|
| 1,042,106 | 10/1912 | Grant | 222—373 |
| 1,749,312 | 3/1930 | Blair | 222—373 X |
| 1,969,960 | 8/1934 | Blum | 222—373 X |
| 2,887,038 | 5/1959 | Rosander | 222—373 X |
| 3,118,569 | 1/1964 | Liedberg et al. | 222—373 X |
| 3,128,925 | 4/1964 | Norcross | 222—442 |

LOUIS J. DEMBO, *Primary Examiner.*